(12) United States Patent
Janke et al.

(10) Patent No.: US 9,982,173 B2
(45) Date of Patent: May 29, 2018

(54) POLYURETHANE HOT-MELT ADHESIVE HAVING A LOW CONTENT OF DIISOCYANATE MONOMERS AND GOOD CROSS-LINKING SPEED

(71) Applicant: SIKA TECHNOLOGY AG, Baar (CH)

(72) Inventors: Doreen Janke, Alveslohe (DE); Mathias Cordes, Hamburg (DE); Kai Paschkowski, Jork (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days. days.

(21) Appl. No.: 15/125,552

(22) PCT Filed: Mar. 5, 2015

(86) PCT No.: PCT/EP2015/054625
§ 371 (c)(1),
(2) Date: Sep. 12, 2016

(87) PCT Pub. No.: WO2015/135833
PCT Pub. Date: Sep. 17, 2015

(65) Prior Publication Data
US 2017/0002239 A1  Jan. 5, 2017

(30) Foreign Application Priority Data
Mar. 11, 2014 (EP) ..................................... 14158830

(51) Int. Cl.
| | | |
|---|---|---|
| *C09J 175/04* | (2006.01) |
| *C08G 18/87* | (2006.01) |
| *C08G 18/83* | (2006.01) |
| *C09J 175/08* | (2006.01) |
| *C08G 18/76* | (2006.01) |
| *C08G 18/78* | (2006.01) |
| *C08G 18/80* | (2006.01) |
| *C08G 18/12* | (2006.01) |
| *C08G 18/28* | (2006.01) |
| *C08G 18/42* | (2006.01) |
| *C08G 18/10* | (2006.01) |
| *C09J 5/00* | (2006.01) |
| *C09J 175/06* | (2006.01) |

(52) U.S. Cl.
CPC ............ *C09J 175/04* (2013.01); *C08G 18/10* (2013.01); *C08G 18/12* (2013.01); *C08G 18/289* (2013.01); *C08G 18/42* (2013.01); *C08G 18/4202* (2013.01); *C08G 18/7671* (2013.01); *C08G 18/7843* (2013.01); *C08G 18/809* (2013.01); *C08G 18/837* (2013.01); *C09J 5/00* (2013.01); *C09J 7/38* (2018.01); *C09J 175/06* (2013.01); *C09J 175/08* (2013.01); *C08G 2170/00* (2013.01); *C08G 2170/20* (2013.01); *C09J 2201/61* (2013.01); *C09J 2475/00* (2013.01)

(58) Field of Classification Search
CPC .................. C08G 18/837; C08L 75/04–75/12
See application file for complete search history.

(56) References Cited

U.S. PATENT DOCUMENTS

| | | | | |
|---|---|---|---|---|
| 6,515,164 | B1 * | 2/2003 | Bolte | ........................ B32B 7/12 156/331.4 |
| 6,903,167 | B2 * | 6/2005 | Bolte | ..................... C08G 18/10 156/331.4 |
| 8,263,226 | B2 * | 9/2012 | Rosenau | ................ C08G 18/12 156/329 |
| 2010/0040894 | A1 * | 2/2010 | Rosenau | ................ C08G 18/12 428/447 |
| 2012/0196977 | A1 * | 8/2012 | Tomiyama | ........... C08G 18/289 524/590 |
| 2014/0242323 | A1 * | 8/2014 | Giorgini | ................. C08G 18/10 428/76 |

FOREIGN PATENT DOCUMENTS

| | | |
|---|---|---|
| DE | 44 29 679 A1 | 2/1996 |
| DE | 196 16 046 A1 | 11/1997 |
| DE | 102 15 641 C1 | 11/2003 |
| EP | 0 096 249 A1 | 12/1983 |
| EP | 0 337 898 A1 | 10/1989 |
| EP | 1 801 138 A1 | 6/2007 |
| JP | 2001-240844 * | 4/2001 |
| JP | 2003-49147 * | 2/2003 |
| JP | 2005-075877 A * | 3/2005 |
| WO | 01/14443 A1 | 3/2001 |
| WO | 01/40340 A2 | 6/2001 |
| WO | 01/40342 A1 | 6/2001 |
| WO | 03/006521 A1 | 1/2003 |
| WO | 03/033562 A1 | 4/2003 |
| WO | 03/055929 A1 | 7/2003 |
| WO | 2007/036575 A1 | 4/2007 |

OTHER PUBLICATIONS

Machine translation of JP 2003-49147 (no date).*
Sep. 13, 2016 International Preliminary Report on Patentability issued in International Patent Application No. PCT/EP2015/054625.
Jun. 1, 2015 International Search Report issued in International Patent Application No. PCT/EP2015/054625.

* cited by examiner

*Primary Examiner* — Marc S Zimmer
(74) *Attorney, Agent, or Firm* — Oliff PLC (57) ABSTRACT

A moisture-cured hot-melt adhesive can be formulated as a PUR-HM that is R-40 classification-free and stable during storage and processing, having a residual monomer content of less than 1 wt. % and having good cross-linking density and full-curing speed. The hot-melt adhesive is particularly suitable for vehicle construction in industrial manufacture, in particular of automobiles, in the textile or furniture industry or in the packaging industry.

15 Claims, 1 Drawing Sheet

Figure 1:
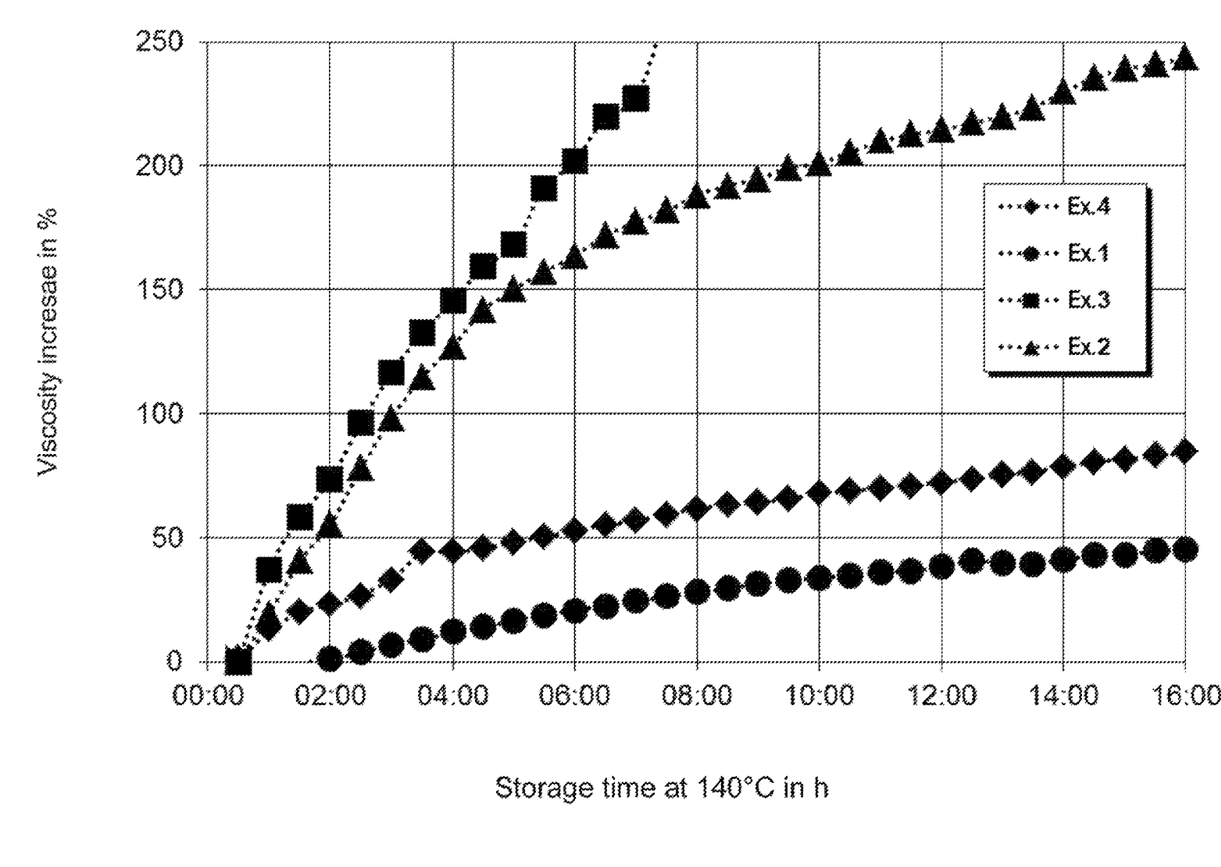

POLYURETHANE HOT-MELT ADHESIVE HAVING A LOW CONTENT OF DIISOCYANATE MONOMERS AND GOOD CROSS-LINKING SPEED

TECHNICAL FIELD

The invention pertains to the field of polyurethane hotmelt adhesives.

PRIOR ART

Reactive polyurethane compositions which can be employed as hotmelt adhesives—also called hotmelts—are known (PU-HM). They consist mostly of isocyanate-terminated polyurethane prepolymers which are obtained by reacting suitable polyols with an excess of diisocyanates. Immediately after their application, adhesives of this kind develop a high initial adhesive strength, by cooling, and acquire their ultimate properties, especially heat stability and resistance to environmental influences by the gradual "curing" process, i.e., the chemical reaction of the isocyanate groups with atmospheric moisture.

Owing to the molar mass distribution which results from the prepolymerization reaction, PU-HMs of this kind include significant quantities of unconverted monomeric diisocyanates ("monomers"), which undergo outgassing at the application temperatures customary for hotmelt adhesives, of 85 to 200° C., typically 120 to 160° C., and which may pose a health challenge to the user, being irritant, sensitizing or toxic substances.

Within the EU, the legislator requires products to be labeled as harmful (Xn) if their monomer content exceeds the limit of 0.1 wt %. At a concentration of monomeric MDI of >1%, moreover, these products must be labeled with an additional R phrase: R-40—limited evidence of a carcinogenic effect. For these reasons, various efforts have been made to reduce the monomer content in reactive PU-HMs.

One obvious approach is the physical removal of the monomer by distillation or extraction, described for example in WO 01/14443 A1 and WO 01/40340 A2 (distillation) and also in U.S. Pat. No. 6,133,415, DE 19616046 A1, and EP 0337898 A1 (extraction). These techniques involve complex apparatus and are therefore expensive; furthermore, they are not readily applicable to every monomer.

The use is known of stripped prepolymers, an example being Desmodur®VPLS 2397. A PU-HM of this kind displays the following disadvantages: reduction in heat stability, inadequate storage stability, and very low adhesion.

Another approach lies in the use of specific diisocyanates having isocyanate groups of different reactivity, described for example in WO 03/033562 A1, WO 03/006521 A1, and WO 03/055929 A1. Described in particular is the use of an asymmetric MDI isomer, 2,4'-diphenylmethane diisocyanate, with which prepolymers combining a low monomer content with low viscosity can be obtained in a simple way. A disadvantage of this process is the inadequate availability of suitable monomers on the industrial scale, in conjunction with a high price. There are also losses to be accepted in terms of the cure rate, since only the isocyanate groups having the lower reactivity are available primarily for the curing reaction.

One approach, lastly, involves using adducts or oligomers of the monomeric diisocyanates, rather than the monomeric diisocyanates themselves, in the prepolymerization, in order to reduce the volatility; this is described in WO 01/40342 A1 and DE 4429679 A1, for example. Disadvantages arise here in the viscosity and the reactivity of the products thus prepared.

The use of latent curing agents is described in WO 2007/036575 A1. This technology allows the formulation of labeling-free and storage-stable PU-HMs. With this approach, disadvantages arise in the emissions behavior (VDA 278). Owing to high emissions in VOC and FOG, the products thus formulated cannot be employed for automobile applications, since the emissions of the adhesives far exceed the limits.

The use of silanes is known, examples being mercaptosilanes. Through this technology it is possible to formulate R-40-free or labeling-free PU-HMs. With this approach, disadvantages arise in the emissions behavior (VDA 277) because of the methanol, which is eliminated as a condensation product in the curing reaction. A further disadvantage is that by comparison with the NCO-water curing reaction, the silane chemistry is far slower at low temperatures and atmospheric humidities. In the case of application in automaking this causes great disadvantages, since adhesively bonded assemblies of this type are required to pass climatic cycling tests after a relatively short cure time.

A reactive polyurethane composition which can be used as a hotmelt adhesive (PU-HM) and which is based on isocyanate-terminated prepolymers which are obtained in a simple process, starting from polyols and industrially available monomeric diisocyanates, the composition having a low content of these very monomers, being storage-stable and readily workable, and possessing relatively low emissions by comparison with the above-identified approach, and also having good through-cure speed at low temperatures and atmospheric humidities, has not hitherto been disclosed.

EP 1801138 A1 relates to a moisture-curing hotmelt adhesive comprising a silane-functional polyurethane prepolymer which is obtained by reaction of an isocyanate-functional polyurethane prepolymer with a mercaptosilane.

DE 10215641 C1 describes the production of a polyurethane composition which is suitable as a hotmelt adhesive and has a low fraction of diisocyanate monomers, obtained by reacting an isocyanate-reactive polymer with a monomeric diisocyanate and subsequently adding an isocyanate-terminated prepolymer having a monomeric diisocyanate content of not more than 0.1 wt %.

SUMMARY OF THE INVENTION

It is an object of the present invention, therefore, to provide moisture-curing hotmelt adhesives which overcome the disadvantages stated above according to the prior art. A hotmelt adhesive based on a reactive polyurethane composition (PU-HM) in particular is to be provided wherein the isocyanate-terminated prepolymer can be obtained in a simple process starting from polyols and from industrially available monomeric diisocyanates, the hotmelt adhesive nevertheless having a low monomeric diisocyanate content, being storage-stable and readily workable, and possessing relatively low emissions, and also having a good through-cure rate at low temperatures and atmospheric humidities.

Surprisingly it has been found that the object can be achieved with a moisture-curing hotmelt adhesive as claimed in claim 1 and by the process as claimed in claim 12 for preparing the moisture-curing hotmelt adhesive.

The process for preparing the hotmelt adhesives of the invention is extremely simple, inexpensive, and amiable to implementation in a standard batch reactor, relative to the processes described from the prior art. The monomer content of the hotmelt adhesive is reduced drastically through the modifying reaction of mercaptosilane, since the mercaptosilane reacts preferentially with the monomeric diisocyanate. Reaction of the mercaptosilane with the prepolymer is, however, also possible. The resulting adhesive, in comparison with the unmodified variant, has a somewhat poorer storage stability under hot conditions, and also a somewhat poorer working stability on open application lines.

By using a relatively small amount of mercaptosilane, the crosslinking rate is reduced only moderately. On the other hand, the use of the mercaptosilane, and the prepolymer used as component d), reduce the monomer content significantly. The advantage this provides is that the systems require reaction with less mercaptosilane, with beneficial consequences for the rate of the crosslinking reaction and for the overall emissions on silane curing, where methanol is formed as the condensation product. Heat resistance is reduced only slightly.

The advantage of the hotmelt adhesive of the invention is in particular that of drastically reducing the monomer content, by using mercaptosilane, and of drastically reducing the content of monomeric polyisocyanate such as MDI, by adding prepolymer of low monomer content, thus allowing the formulation of R40-free PU-HM with a monomer content below 1%, and at the same time enabling the attainment of high stability in the adhesives thus formulated, under hot conditions (storage stability) and on open application lines (working stability), reduced emissions by comparison with conventional silane-modified PU-HM, and sufficiently good crosslinking rate and also high stability of the cured adhesive under hot conditions.

Further aspects of the invention are a method for adhesive bonding with the hotmelt adhesive, and also an article obtained by this method, and the use of the hotmelt adhesive. Further embodiments are subjects of the dependent claims.

Ways of Performing the Invention

The prefix "poly" in substance designations such as "polyol" or "polyisocyanate" refers to substances which in formal terms contain two or more per molecule of the functional group that occurs in their designation. A polyol, for example, is a compound having two or more hydroxyl groups, and a polyisocyanate is a compound having two or more isocyanate groups.

A monomer is a molecule having at least one polymerizable group. A monomeric diisocyanate or polyisocyanate contains in particular no urethane group. The monomeric diisocyanate or polyisocyanate has in particular a molecular weight of not more than 1000 g/mol, preferably not more than 500 g/mol, and more preferably not more than 400 g/mol.

A prepolymer is a polymer which contains at least one, usually two or more, reactive group(s), isocyanate groups for example. By way of the reactive groups, the prepolymer may be chain-extended, crosslinked or cured.

The average molecular weight refers here to the number-average molecular weight, which is determined by GPC analysis (gel permeation chromatography).

The viscosity was measured with a rheomat (Brookfield, Thermosel, spindle 27, shear rate 1 min$^{-1}$).

The invention provides a moisture-curing hotmelt adhesive obtainable by a process comprising A) reacting one or more polyols as component a) with one or more monomeric polyisocyanates, preferably diisocyanates, as component b), the stoichiometric ratio of isocyanate groups to hydroxyl groups being greater than 1, to give a reaction product comprising an isocyanate-functional polyurethane prepolymer, B) adding at least one mercaptosilane of the formula (I) as component c)

$$\text{HS}-R^3-\text{Si}(X)_{(3-a)}(R^2)_a \qquad (I)$$

in which $R^2$ is a linear or branched alkyl group having 1 to 10 C atoms, $R^3$ is a linear or branched alkylene group having 1 to 10 C atoms, X is a hydrolyzable radical, and a has a value of 0, 1 or 2, preferably 0, to the reaction product and carrying out reaction to give a reaction product modified with the mercaptosilane, and C) adding an isocyanate-functional polyurethane prepolymer having a monomeric polyisocyanate content of below 1 wt % as component d) before, during and/or after the adding of the mercaptosilane to the reaction product or modified reaction product, the at least one mercaptosilane being added in an amount of 0.5 to 3.5 wt % and the isocyanate-functional polyurethane prepolymer as component d) being added in an amount of 10 to 50 wt %, based in each case on the total weight of the components a) to d).

The invention further provides a process for preparing the moisture-curing hotmelt adhesive.

The moisture-curing hotmelt adhesive of the invention is obtainable by a process in which in the first step A) one or more polyols as component a) are reacted with one or more monomeric polyisocyanates, preferably monomeric diisocyanates, as component b), the stoichiometric ratio of isocyanate groups to hydroxyl groups being greater than 1, to give a reaction product comprising an isocyanate-functional polyurethane prepolymer. This is the generally customary process known to the person skilled in the art for preparing isocyanate-functional polyurethanes.

Component a)

One or more polyols may be used. Preferred polyols are one or more polyether polyols, one or more polyester polyols, one or more polycarbonate polyols, and mixtures thereof, with polyester polyols being particularly preferred. The polyols are, for example, diols or triols or mixtures thereof. Particularly preferred are one or more diols, more particularly one or more polyether diols, one or more polyester diols, one or more polycarbonate diols, and mixtures thereof.

Particularly preferred polyols are one or more polyester polyols, e.g., polyester triols and, in particular, polyester diols. Suitable polyester polyols are amorphous, semicrystalline or crystalline polyester polyols which are liquid at 25° C., such as polyester triols and especially polyester diols, and mixtures of these polyester polyols. Liquid polyols, polyester polyols for example, are taken here to be polyols, polyester polyols for example, which are liquid at a temperature of 25° C. The liquid polyester polyols are preferably polyester polyols which solidify at a temperature between 0 to 25° C.

Preferred for use as polyol is a combination of a liquid polyester polyol, such as a polyester triol or, preferably, a polyester diol, with at least one amorphous, semicrystalline or crystalline polyester polyol, such as a polyester triol or more particularly a polyester diol.

Particularly suitable as polyols are one or more liquid polyester diols and mixtures of one or more liquid polyester diols with one or more amorphous, semicrystalline or crystalline polyester diols, particular preference being given to a mixture of one or more amorphous polyester diols with one or more liquid polyester diols.

The polyester polyols, e.g., polyester triols and especially polyester diols, preferably have an average molecular weight of 1000 to 15 000 g/mol, more particularly of 1500 to 8000 g/mol, preferably of 1700 to 5500 g/mol.

Preferred polyols also include one or more amorphous polycarbonate diols, and also mixtures of polyester diols and polycarbonate diols.

Particularly suitable polyether polyols, also called polyoxyalkylene polyols, are those which are polymerization products of ethylene oxide, 1,2-propylene oxide, 1,2- or 2,3-butylene oxide, tetrahydrofuran or mixtures thereof, optionally polymerized by means of a starter molecule having two or more active hydrogen atoms, such as, for example, water, ammonia or compounds having two or more OH or NH groups such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the aforesaid compounds. Use may be made both of polyoxyalkylene polyols which have a low degree of unsaturation (measured according to ASTM D-2849-69 and expressed as milliequivalents of unsaturation per gram of polyol (meq/g)), produced for example by means of double metal cyanide complex catalysts (DMC catalysts), and of polyoxyalkylene polyols having a relatively high degree of unsaturation, produced for example by means of anionic catalysts such as NaOH, KOH or alkali metal alkoxides.

Particularly suitable polyether polyols are polyoxyalkylene diols or poly-oxyalkylene triols, especially polyoxyethylene diols or polyoxyethylene triols.

Especially suitable are polyoxyalkylene diols or polyoxyalkylene triols, more particularly polyoxypropylene diols and triols, having an average molecular weight in the range from 1000 to 30 000 g/mol, and also polyoxypropylene diols and triols having an average molecular weight of 400 to 8000 g/mol. Polyether polyols of these kinds are sold under the Acclaim® trade name by Bayer, for example.

Likewise particularly suitable are so-called "EO-endcapped" (ethylene oxide-endcapped) polyoxypropylene diols or triols. The latter are special polyoxypropylene-polyoxyethylene polyols, which are obtained, for example, by alkoxylating pure polyoxypropylene polyols with ethylene oxide after the end of the polypropoxylation, and which therefore have primary hydroxyl groups.

Especially suitable polyester polyols, preferably polyester triols and especially polyester diols, are those which are prepared from dihydric to trihydric, preferably dihydric, alcohols, such as, for example, 1,2-ethanediol, diethylene glycol, triethylene glycol, 1,2-propanediol, 1,3-propanediol, dipropylene glycol, 1,4-butanediol, 1,5-pentanediol, 1,6-hexanediol, 1,8-octanediol, 1,10-decanediol, 1,12-dodecanediol, dimer fatty alcohol, neopentyl glycol, glycerol, 1,1,1-trimethylolpropane or mixtures of the aforesaid alcohols, with organic dicarboxylic acids or tricarboxylic acids, preferably dicarboxylic acids, or their anhydrides or esters, such as succinic acid, glutaric acid, 3,3-dimethylglutaric acid, adipic acid, suberic acid, sebacic acid, undecanedioic acid, dodecanedicarboxylic acid, azelaic acid, maleic acid, fumaric acid, phthalic acid, dimer fatty acid, isophthalic acid, terephthalic acid, and hexahydrophthalic acid, or mixtures of the aforesaid acids, and also polyester polyols made from lactones such as from ε-caprolactone, for example, also called polycaprolactones.

Particularly suitable polyester polyols are polyester polyols made from adipic acid, sebacic acid or dodecanedicarboxylic acid as dicarboxylic acid and from hexanediol or neopentyl glycol as dihydric alcohol.

Further examples of suitable polyester polyols are polyester polyols of oleochemical origin. Polyester polyols of this kind may be prepared, for example, by complete ring opening of epoxidized triglycerides of a fat mixture comprising at least partly olefinically unsaturated fatty acid, with one or more alcohols having 1 to 12 C atoms, and by subsequent partial transesterification of the triglyceride derivatives to give alkyl ester polyols having 1 to 12 C atoms in the alkyl radical.

Particularly suitable crystalline or semicrystalline polyester polyols are adipic acid/hexanediol polyester and dodecanedicarboxylic acid/hexanediol polyesters.

Suitable polycarbonate polyols are those as are obtainable by reaction, for example, of the abovementioned dihydric or trihydric alcohols—those used to synthesize the polyester polyols—with dialkyl carbonates, diaryl carbonates or phosgene. Polycarbonate diols are particularly suitable, especially amorphous polycarbonate diols.

Other suitable polyols are castor oil and its derivatives or hydroxy-functional polybutadienes, which are available, for example, under the "Poly-bd" trade name.

The fraction of the at least one polyol as component a) may be situated for example in a range from 40 to 90 wt %, preferably 50 to 85 wt %, more preferably 60 to 80 wt %, based on the total weight of components a) to d).

Component b)

Monomeric polyisocyanates which can be used for preparing the reaction product are aliphatic, cycloaliphatic or aromatic polyisocyanates, more particularly diisocyanates. It is possible to use the customary monomeric polyisocyanates or diisocyanates that are available commercially.

Examples of monomeric polyisocyanates, preferably monomeric diisocyanates, are 1,6-hexamethylene diisocyanate (HDI), 2-methylpenta-methylene 1,5-diisocyanate, 2,2,4- and 2,4,4-trimethyl-1,6-hexamethylene diisocyanate (TMDI) and mixtures of these isomers, 1,10-decamethylene diisocyanate, 1,12-dodecamethylene diisocyanate, lysine diisocyanate and lysine ester diisocyanate, cyclohexane 1,3- and 1,4-diisocyanate and mixtures of these isomers, 1-methyl-2,4- and -2,6-diisocyanatocyclohexane and mixtures of these isomers (HTDI or H$_6$TDI), 1-isocyanato-3,3,5-trimethyl-5-isocyanatomethylcyclohexane (i.e., isophorone diisocyanate or IPDI), perhydro-2,4'- and -4,4'-diphenylmethane diisocyanate (HMDI or H$_{12}$MDI) and mixtures of these isomers, 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI) and mixtures of these isomers, m- and p-tetramethyl-1,3- and -1,4-xylylene diisocyanate (m- and p-TMXDI) and mixtures of these isomers, bis(1-isocyanato-1-methylethyl)naphthalene, 2,4- and 2,6-toluylene diisocyanate and mixtures of these isomers (TDI), 4,4'-, 2,4'- and 2,2'-diphenylmethane diisocyanate and mixtures of these isomers (MDI), 1,3- and 1,4-phenylene diisocyanate and mixtures of these isomers, 2,3,5,6-tetramethyl-1,4-diisocyanatobenzene, naphthalene 1,5-diisocyanate (NDI), 3,3'-dimethyl-4,4'-diisocyanatobiphenyl (TODI, dianisidine diisocyanate (DADI), and also mixtures of the aforesaid isocyanates. For the formulation of light-stable compositions, preference is given to using aliphatic and cycloaliphatic polyisocyanates.

Preferred are MDI, TDI, HDI, and IPDI. Particularly preferred are MDI, more particularly 4,4'-diphenylmethane diisocyanate (4,4'-MDI), and IPDI.

The monomeric polyisocyanate, preferably the monomeric diisocyanate, preferably has a molecular weight of not more than 500 g/mol, more preferably not more than 400 g/mol.

Reaction Product

The one or more polyols and the one or more monomeric polyisocyanates, preferably diisocyanates, are reacted in a ratio such that the stoichiometric ratio of isocyanate groups to hydroxyl groups is greater than 1. The stoichiometric ratio between isocyanate groups and hydroxyl groups is preferably in the range from 1.3 to 2.5, more preferably from 1.5 to 2.2.

The reaction for preparing the isocyanate-functional polyurethane prepolymer takes place in a known way directly from the polyisocyanates and the polyols, or by stepwise adduction processes, which are also known as chain extension reactions.

The reaction of the at least one polyol with the at least one monomeric polyisocyanate, preferably monomeric diisocyanate, may be carried out for example at temperatures in the range from 60 to 160° C., preferably from 80 to 140° C. The duration of the reaction is of course dependent on the temperature used, but may for example be 30 minutes to 3 hours, preferably from 1 hour to 1.5 hours.

From the reaction, a reaction product comprising an isocyanate-functional polyurethane prepolymer is obtained. With preference the reaction product contains more than 90 wt %, more preferably more than 95 wt %, of isocyanate-functional polyurethane prepolymer, based on the total weight of the reaction product. Also present in the reaction product, in particular, is unconverted monomeric polyisocyanate, more particularly monomeric diisocyanate. The reaction product generally has an unconverted monomeric polyisocyanate content of more than 1 wt %, e.g., 1.5 to 5 wt %, more particularly about 2 to 4 wt %, based on the total weight of the reaction product.

It is further advantageous if the isocyanate-functional polyurethane prepolymer is solid at 20° C. It may be crystalline, semicrystalline or amorphous. For a semicrystalline or amorphous isocyanate-functional polyurethane prepolymer, it has little or no fluidity at 20° C., meaning that its viscosity at 20° C. is preferably more than 5000 Pa·s.

It is preferred, moreover, if the isocyanate-functional polyurethane prepolymer has an average molecular weight of more than 1000 g/mol, more particularly of 1200 to 50 000 g/mol, preferably of 2000 to 30 000 g/mol.

The isocyanate-functional polyurethane prepolymer also preferably has an average isocyanate functionality in the range from 1.8 to 2.2.

To the person skilled in the art it is clear that the polyols and polyisocyanates used customarily represent mixtures having different functionalities. Frequently, for example, a technical diol, as well as the diol, also contains monols as a byproduct, and so the average functionality is not 2 but instead less than 2. Additionally, technical diols may also include additions of triols, and so the average functionality is not 2 but instead more than 2.

In step B), a mercaptosilane is added to the resulting reaction product and reacted with it, to give a reaction product modified with the mercaptosilane. One or more mercaptosilanes of the formula (I) may be used.

Component c)

The mercaptosilane added is a mercaptosilane of the formula (I)

(I)

in which $R^2$ is a linear or branched alkyl group having 1 to 10 C atoms, $R^3$ is a linear or branched alkylene group having 1 to 10 C atoms, X is a hydrolyzable radical, and a has a value of 0, 1 or 2, preferably 0.

In the formula (I), $R^2$ is a linear or branched alkyl group having 1 to 10 C atoms, preferably a linear or branched alkyl group having 1 to 4 C atoms, methyl or ethyl for example. As already indicated, a is preferably 0, and in that case there is no substituent $R^2$, and the mercaptosilane has three hydrolyzable groups X.

In the formula (I), $R^3$ is a linear or branched alkylene group having 1 to 10 C atoms, preferably a linear or branched alkylene group having 1 to 6 C atoms, such as methylene, ethylene, propylene, 2-methylpropylene, and 3,3-dimethylbutylene, for example. $R^3$ is more preferably methylene or propylene.

The hydrolyzable radicals X may be identical or different. Such hydrolyzable radicals are well known in silane chemistry. Hydrolyzable radicals are groups on a silicon atom that can be hydrolyzed by water, optionally in the presence of catalysts. In the hydrolysis reaction, the hydrolyzable group is displaced from the silicon atom and replaced formally by a hydroxyl group (Si—X+$H_2$O→Si—OH+HX). The silanol groups formed in the hydrolysis are reactive and generally undergo spontaneous condensation to form siloxane bridges.

The hydrolyzable radicals X in the mercaptosilane of the formula (I) may be those customary in silicone chemistry. Examples of suitable hydrolyzable radicals X have the formulae (X-1), (X-2), (X-3), (X-4), (X-5), (X-6), (X-7), and (X-8) below, in each of which the dashed line symbolizes the bond to the Si atom.

(X-1)

(X-2)

(X-3)

(X-4)

(X-5)

(X-6)

(X-7)

(X-8)

where R' and R" independently of one another are alkyl or aryl and $R^4$ is a linear or branched alkyl group having 1 to 10 C atoms, which optionally contains 1 or 2 ether oxygens, more particularly a linear or branched alkyl group having 1 to 4 C atoms, especially methyl, ethyl or isopropyl.

In one specific version, two alkoxy groups —OR$^4$ may together be a alkylenedioxy group —OR$^5$O—, forming a five-membered or six-membered ring with the silicon atom, where R$^5$ is an alkylene group having 2 to 10, more particularly 2 or 3, C atoms.

More preferably the hydrolyzable radical X is an alkoxy group —OR$^4$, more particularly methoxy, ethoxy or isopropoxy, with methoxy being particularly preferred.

Examples of suitable mercaptosilanes of the formula (I) are mercaptom ethyltrimethoxysilane, mercaptom ethyltriethoxysilane, mercaptomethyldimethoxymethylsilane, mercaptomethyldiethoxymethylsilane, 3-mercaptopropyltrimethoxysilane, 3-mercaptopropyltriethoxysilane, 3-mercaptopropyltriisopropoxysilane, 3-mercaptopropylmethoxy(1,2-ethylenedioxy)silane, 3-mercaptopropylmethoxy(1,2-propylenedioxy)silane, 3-mercaptopropylethoxy(1,2-propylenedioxy)silane, 3-mercaptopropyldimethoxymethylsilane, 3-mercaptopropyldiethoxymethylsilane, 3-mercapto-2-methylpropyltrimethoxysilane and 4-mercapto-3,3-dimethylbutyltrimethoxysilane.

Preferred mercaptosilanes of the formula (I) are 3-mercaptopropyltrimethoxysilane, 3-mercaptopropyltriethoxysilane, mercaptomethyltrimethoxysilane, and mercaptomethyltriethoxysilane, with 3-mercaptopropyltrimethoxysilane and mercaptomethyltrimethoxysilane being particularly preferred.

The at least one mercaptosilane of the formula (I) is added in a fraction of 0.5 to 3.5 wt %, preferably 1 to 3.3 wt %, more preferably 1.3 to 3 wt %, and very preferably from 1.6 to 2.8 wt %, based on the total weight of the components a) to d).

It is further preferred for the at least one mercaptosilane of the formula (I) to be added in a fraction of less than 3 wt %, preferably not more than 2.8 wt %, and more preferably not more than 2.5 wt %, based on the total weight of components a) and b). It is further preferred for the at least one mercaptosilane of the formula (I) to be added in a fraction of at least 1 wt %, more preferably at least 1.8 wt %, and very preferably at least 2 wt %, based on the total weight of components a) and b).

Modified Reaction Product

The reaction of the mercaptosilane of the formula (I) with the reaction product takes place in a known way, to give a modified reaction product. Here, in particular, the thiol group of the mercaptosilane reacts with the isocyanate groups present in compounds of the reaction product, more particularly with the isocyanate groups of the unconverted monomeric polyisocyanate, more particularly diisocyanate, of the isocyanate-functional polyurethane prepolymer formed and, optionally, of the added isocyanate-functional polyurethane prepolymer of low monomer content (component d). As elucidated below, component d) may also be added before or simultaneously with the mercaptosilane to the reaction product.

In the reaction of the thiol groups of the mercaptosilane with the isocyanate groups present in the reaction product, the reaction involved is a commonly known addition reaction, in which thiourethane or thiolourethane groups are formed. Without wishing to be tied to any one theory, it is assumed that the mercaptosilane reacts preferentially with the more reactive monomeric polyisocyanates, especially diisocyanates, so reducing the monomer fraction in the reaction product. A reaction of the mercaptosilane with the isocyanate-functional prepolymers present in the reaction product is, however, likewise possible.

The reaction of the mercaptosilane with the reaction product, which optionally already comprises component d), to form the modified reaction product takes place preferably at an elevated temperature, as for example at a temperature of at least 60° C., preferably at least 100° C., more preferably at least 110° C. or at least 140° C. The duration of the reaction is of course dependent on the temperature used, but may for example be 0.5 to 2 hours, preferably from 45 minutes to 1.5 hours.

A catalyst may optionally be added for the reaction with the mercaptosilane. Examples of suitable catalysts are titanates, organotin compounds, bismuth compounds, with organic ligands and/or complex ligands, for example, and compounds containing amino groups.

In a further step (step C)), an isocyanate-functional polyurethane prepolymer having a monomeric polyisocyanate content of below 1 wt % is added as component d) before, during and/or after the addition of the mercaptosilane to the reaction product or modified reaction product. For this purpose it is possible to use one or more such isocyanate-functional polyurethane prepolymers of low monomer content.

Component d)

The isocyanate-functional polyurethane prepolymer used as component d) has a monomeric polyisocyanate content of below 1 wt %, preferably not more than 0.5 wt %, more preferably not more than 0.15 wt %, and is also referred to below as polyurethane prepolymer of low monomer content. It may also be substantially free from monomeric polyisocyanates.

The polyurethane prepolymer of low monomer content is prepared in the usual way from the reaction of one or more polyols and one or more monomeric polyisocyanates. As discussed above, the isocyanate-functional polyurethane prepolymers prepared by customary processes contain a residual content of unconverted monomeric polyisocyanate which accounts in general for more than 1 wt % of the product. The monomeric polyisocyanate which is a reactant for the polyurethane prepolymer of low monomer content and may be present in a residual content, has in particular a molecular weight of not more than 1000 g/mol, preferably not more than 500 g/mol, and more preferably not more than 400 g/mol.

As noted in the discussion of the prior art, there are known processes for preparing polyurethane prepolymers of low monomer content, and these are hereby referenced. Reference is made in particular to the use of specific diisocyanates having isocyanate groups of different reactivities, such as WO 03/033562 A1, WO 03/006521 A1, and WO 03/055929 A1, for example; the use of adducts or oligomers of the monomeric polyisocyanates, as described in WO 01/40342 A1 and DE 4429679 A1, for example; and the aftertreatment of the isocyanate-functional polyurethane prepolymers prepared conventionally, by distillation or extraction in order to reduce the residual monomeric polyisocyanate content of the product, as described in WO 01/14443 A1, WO 01/40340 A2, U.S. Pat. No. 6,133,415, DE 19616046 A1 or EP 0337898 A1, for example.

The polyurethane prepolymers of low monomer content that are obtainable by these processes can be used in the process of the invention. Polyurethane prepolymers of low monomer content of this kind are also available commercially.

The polyols and polyisocyanates which may be used for preparing the polyurethane prepolymers of low monomer content may be the same as those elucidated above as component a) and component b), including the preferred embodiments identified there, with the proviso that the selection is confined in this respect with regard to the abovementioned techniques using specific polyisocyanates.

Preferred polyurethane prepolymers of low monomer content are those in which the monomer content has been reduced by extraction or, in particular, distillation. The distillation may take place, for example, by stripping on a thin-film evaporator.

Particularly preferred as polyurethane prepolymer of low monomer content as component d) is a reaction product of at least one polyol and at least one monomeric polyisocyanate, with residual monomeric polyisocyanate having been removed by distillation or extraction to a residual content of below 1 wt %, preferably not more than 0.5 wt %, more preferably not more than 0.15 wt %, in the reaction product.

The polyurethane prepolymer of low monomer content is based preferably on a reaction product of at least one polyol and at least one monomeric polyisocyanate, more particularly monomeric diisocyanate, where the polyol is a polyether polyol, more particularly a polypropylene glycol, or a liquid polyester polyol, and/or the monomeric diisocyanate is preferably MDI, TDI, HDI, and IPDI, more preferably 4,4'-MDI and IPDI, in which monomeric diisocyanate has subsequently been reduced or largely removed by extraction or, in particular, distillation.

Particular preference is given to using a polyurethane prepolymer of low monomer content which is obtained by reaction of a polyether polyol, such as polypropylene ether glycol, and MDI with subsequent removal of unconverted MDI. A product of this kind is available commercially as Desmodur®VP LS 2397 from Bayer Material Science. Desmodur®VP LS 2397 has a MDI monomer content of not more than 0.15 wt % and an average molecular weight of 1100-1500 g/mol.

The isocyanate-functional polyurethane prepolymer as component d) may be added before, during and/or after the addition of the mercaptosilane to the reaction product or to the modified reaction product. The sequence is arbitrary. In general it may be useful to add the component d) to the reaction product before the mercaptosilane is admixed and reacted. It is, however, equally possible for component d) to be admixed to the modified reaction product during and/or after the reaction of the reaction product with the mercaptosilane.

The isocyanate-functional polyurethane prepolymer as component d) is added preferably at an elevated temperature to the reaction product or to the modified reaction product, to give a homogeneous mixture, at a temperature, for example, of at least 60° C., preferably at least 100° C., and more preferably at least 110° C.

The isocyanate-functional polyurethane prepolymer as component d) is added in a fraction of 10 to 50 wt %, preferably of 10 to 45 wt %, more preferably of 10 to 30 wt %, and very preferably of 10 to 20 wt %, based on the total weight of components a) to d).

Optional Components

The moisture-curing hotmelt adhesive may optionally be admixed with further auxiliaries which are customary for such hotmelt adhesives. The auxiliaries may be added at any desired point in time to the reaction product and/or modified reaction product. In general it is useful for the optional auxiliary or auxiliaries to be added at an elevated temperature, in order to obtain a homogeneous mixture, such as at a temperature of at least 60° C., preferably at least 100° C., and more preferably at least 110° C.

Optional auxiliaries, if used at all, make up preferably not more than 60 wt %, preferably not more than 50 wt %, based on the total weight of the moisture-curing hotmelt adhesive.

Examples of suitable optional auxiliaries are one or more thermoplastic polymers and/or one or more additives, more particularly selected from fillers, catalysts, plasticizers, adhesion promoters, UV absorbers, UV stabilizers and heat stabilizers, antioxidants, flame retardants, optical brighteners, pigments, dyes, and dryers.

The optional thermoplastic polymers are preferably not reactive thermoplastic polymers. Examples are homopolymers or copolymers of unsaturated monomers, more particularly from the group encompassing ethylene, propylene, butylene, isobutylene, isoprene, vinyl acetate, and higher esters thereof, and (meth)acrylate. Particularly suitable are ethylene-vinyl acetate copolymer (EVA), atactic poly-α-olefin (APAO), polypropylene (PP), and polyethylene (PE).

Especially suitable as catalysts are those which catalyze the hydrolysis and/or crosslinking of silane groups. Examples of such catalysts include titanates, organotin compounds such as dibutyltin dilaurate and dibutyltin diacetylacetonate, bismuth-organic compounds or bismuth complexes, compounds containing amino groups, e.g., 1,4-diazabicyclo[2.2.2]octane, or 2,2'-dimorpholinodiethyl ether. Examples of other catalysts are catalysts which catalyze the reaction of isocyanate groups.

Moisture-Curing Hotmelt Adhesive

The moisture-curing hotmelt adhesive preferably has a monomeric polyisocyanate content of not more than 1.0 wt %, more preferably not more than 0.9 wt %, and very preferably not more than 0.8 wt %, based on the total weight of the hotmelt adhesive.

The moisture-curing hotmelt adhesive of the invention is meltable, meaning that at application temperature it has sufficiently low viscosity to enable suitable application, and on cooling it quickly becomes solid, and so is quickly able to accommodate forces, even before the crosslinking reaction with atmospheric moisture has concluded.

It has emerged that the moisture-curing hotmelt adhesive at a temperature of 150° C. may have a viscosity of less than 100 000 mPas, more particularly of less than 50 000 mPas, and at 70° C. may in particular have a viscosity of more than 20 000 mPas, more particularly of more than 50 000 mPas.

A feature of the moisture-curing hotmelt adhesive of the invention is that the level of monomeric poly- and/or diisocyanates therein ("monomers"), such as MDI, for example, is low, and hence the adhesive possesses a relatively high level of safe working, thereby protecting workers from harmful diisocyanate vapors. The low monomer content permits the formulation of R-40 free (Limited evidence of a carcinogenic effect) PU-HMs, i.e., those having a monomer content of below 1.0 wt %. At the same time the composition has good crosslinking density and through-cure rate. The hotmelt adhesive of the invention, moreover, is good to work.

The moisture-curing hotmelt adhesive of the invention is suitable in particular as a storage-stable and working-stable PU-HM which is free from R-40 classification. The moisture-curing hotmelt adhesive of the invention is suitable in particular for industrial applications, such as in vehicle construction, particularly in automotive engineering, in the textile or furniture industry and in the packaging material industry, as a textile adhesive and as a film adhesive, for example.

The invention also embraces the process for preparing the moisture-curing hotmelt adhesive as described above.

The invention further encompasses a method for adhesively bonding a substrate S1 to a substrate S2, comprising the steps of
i) heating a moisture-curing hotmelt adhesive of the invention to a temperature of between 80° C. and 200° C., more particularly between 120° C. and 160° C.;
ii) applying the heated moisture-curing hotmelt adhesive to a substrate S1;
iii) contacting the applied moisture-curing hotmelt adhesive with a second substrate S2; and
iv) chemically curing the moisture-curing hotmelt adhesive with water, more particularly atmospheric moisture,
the substrate S2 consisting of the same material as or different material from the substrate S1.

The person skilled in the art understands that depending on the system used, the temperature, and the reactivity of the adhesive, crosslinking reactions—and hence the chemical curing—may begin already during application. Commonly, however, the major part of the crosslinking and hence the chemical curing in the narrower sense occurs after application.

As and when required, the substrates S1 and/or S2 may be pretreated prior to the application of the hotmelt adhesive. Such pretreatments include, in particular, physical and/or chemical cleaning and activating processes, examples being abrading, sandblasting, brushing, corona treatment, plasma treatment, flame treatment, partial etching or the like, or treatment with cleaners or solvents, or the application of an adhesion promoter, an adhesion promoter solution or a primer.

The substrates S1 and S2 may represent a multiplicity of materials. Especially suitable are plastics, organic materials such as leather, fabrics, paper, wood, resin-bound woodbase materials, resin-textile composite materials, glass, porcelain, ceramic, and also metals and metal alloys, especially painted or powder-coated metals and metal alloys.

Particularly suitable plastics are polyvinyl chloride (PVC), acrylonitrile-butadiene-styrene copolymers (ABS), SMC (sheet molding composites), polycarbonate (PC), polyamide (PA), polyesters (PE), polyoxymethylene (POM), polyolefins (PO), especially polyethylene (PE) or polypropylene (PP), preferably PP or PE which have been surface-treated by a plasma, corona or flaming.

At least one of the substrates, S1 or S2, is preferably a polymeric film, a textile or glass. Preferred materials for the substrates S1 and/or S2 are transparent materials, more particularly transparent polymeric films. Another preferred transparent material is glass, particularly in the form of a glazing sheet.

The moisture-curing hotmelt adhesive is employed in particular in an industrial manufacturing operation. The moisture-curing hotmelt adhesive is especially suitable for adhesive bonds in which the bond location is visible. Hence it is suitable in particular for the bonding of glass, particularly in vehicle construction and window construction, and for the bonding of transparent packaging.

Typical thicknesses for adhesive bonds are 10 micrometers or more. The bond thickness is situated preferably in the range from 10 micrometers to 1000 micrometers, especially from 80 micrometers to 500 micrometers.

The invention also relates to articles which are bonded by the bonding method of the invention. Such articles are, in particular, articles of the transport industry, particularly the automobile industry, furniture industry or textile industry.

Examples of bonded articles are automotive interior trim parts, such as roof linings, sun visors, instrument panels, door side parts, parcel shelves, and the like; wood fiber materials from the bath and shower sector; decorative furniture foils, membrane films with textiles such as cotton, polyester films in the clothing sector, or textiles with foams for automotive equipment.

Further examples of bonded articles are articles from the packaging sector, especially a transparent pack.

EXAMPLES

Examples follow for further elucidation of the invention, but are not intended to restrict the subject matter of the invention in any way.

Unless otherwise indicated, amounts are given by weight. The examples used the following substances:

| | | |
|---|---|---|
| Durez Ter S1151-22 | liquid polyester polyol | Sumitomo Bakelite Durez Division |
| Dynacoll ®7250 | liquid polyester polyol | Evonik |
| Desmodur ®VP LS 2397 | NCO-functional polyurethane based on polypropylene ether glycol and MDI, MDI monomer content ≤ 0.15 wt %, Mn 1100-1500 g/mol | Bayer Material Science |
| Silquest ®A-189 | mercaptopropyltrimethoxysilane | Momentive Performance Material |
| MDI | 4,4'-diphenylmethane diisocyanate (MDI) | |

Measurement Methods

The moisture-curing hotmelt adhesives produced were characterized using the following measurement methods.

Residual Monomer

The amount of unconverted monomeric polyisocyanate remaining in the hotmelt adhesive was determined by means of HPLC (detection via photodiode array) and is expressed in wt %, based on the entire hotmelt adhesive analyzed.

Through-Curing

The through-cure rate of the hotmelt adhesive analyzed was tested on a 500 µm film of adhesive. For this purpose the adhesive was preheated at 140° C. for 30 minutes. Sicol paper (B700 white, width about 6 cm, length about 60 cm, Laufenberg & Sohn KG) and a bar applicator were preheated on a 150° C. hotplate. 20 g of the preheated adhesive are placed in the bar applicator, and a 500 µm film of adhesive with a length of about 60 cm is applied to the Sicol paper on the hotplate. The paper is then removed from the plate. When the adhesive has solidified (start point), the film is housed in a conditioning chamber (23° C., 55% relative humidity). At defined intervals of time, a narrow strip of 10 cm×1 cm is cut from the film and placed on a 150° C. hotplate. This is continued until the strip no longer melts on the hotplate, indicating that the adhesive has undergone through-curing. The time interval from the start point to the time interval at which the strip removed does not melt is the time (in hours) for through-curing.

Heat Stability

The test specimens used for this measurement are two wooden specimens (100 mm×25 mm×5 mm). The area to be bonded is 25 mm×25 mm, and the thickness of adhesive is 1 mm, ensured by means of a spacer 1 mm thick.

The adhesive is melted in a sealed tube at 140° C. for 20 minutes in a heating cabinet. The adhesive is then applied to one side of the first wooden specimen; by means of gentle pressure, it is pressed onto the second specimen, and the bond is fixed with a 500 g weight. The heat stability after full curing (around 1 week) is measured in a heating chamber, beginning at 40° C. The test assembly is suspended in the heating chamber, with a weight of 500 g fastened to the lower specimen. The temperature is raised by 10 K per hour. A record is made of the last temperature at which the bond has not yet failed.

Heat Stability by Canvas Cloth Method

For the determination of the heat stability at 80° C., two canvas cloths each with an area of 150×50 mm are bonded so as to overlap with a bonded area of 100×50 mm. The adhesive is processed by melting in a heating chamber at 140° C. for 30 minutes. A strip of Sicol paper (B700 white, width about 6 cm, length about 50 cm, Laufenberg & Sohn KG) and a bar applicator are preheated and dried on a 150° C. hotplate. About 20 g of the melted adhesive are placed into the bar applicator, and a 100 µm film of adhesive with a length of 50 cm is drawn down onto the Sicol paper on the hotplate. Subsequently, in a transfer process, the film of adhesive is transferred from the Sicol paper to the canvas cloth, with a bond area of 100×50 mm and a thickness of 0.1 mm. It may be necessary to reactivate the dried film of adhesive on the Sicol paper on the hotplate to allow it to be transferred to the canvas cloth. The canvas cloth on which the adhesive is located is placed overlappingly onto a second canvas cloth. The adhesive in the canvas cloth assembly is then reactivated on a 150° C. hotplate, and the two canvas cloths are bonded using a 5 kg pressure roller. The canvas cloth assembly is stored at 23° C. and 550% relative humidity for 7 days for the adhesive to cure. A total of 3 such test specimens are prepared for the test.

The 3 test specimens are then suspended in an 80° C. heating chamber. The 50×50 mm unbounded portion of one canvas cloth is suspended from a hook, and a weight of 500 g is hung from the unbounded portion of the other canvas cloth. The test specimens spend 30 minutes at 80° C. in the heating chamber. After this time, the test specimens are removed from the heating chamber, and any slippage of the bonded area of canvas cloth is measured and recorded. Canvas cloth heat stability is attained when the bonded area of canvas cloth exhibits no slippage (satisfactory, "OK"). If complete or very expensive slippage (>8 cm) is found, the adhesive bond lacks sufficient heat stability (unsatisfactory, "not OK").

Tensile Strength and Elongation at Break

In a method based on DIN 53504, five rectangular test specimens measuring 2.5×10 cm were cut from a cured film 500 µm thick (cured for 7 days at 23° C./50% RH) of the sample. These specimens were clamped into the tensile testing machine (Zwick Z 020) and pulled apart with a speed of 100 mm/min (test conditions 23° C./50% RH). The parameter measured was the tensile force accepted by the sample at maximum. This was used to determine tensile strength and elongation at break, with the average value being determined in each case from the five specimens.

Moisture-curing hotmelt adhesives were prepared. Table 1 reports the fractions used of the components for each of the examples in wt %, and also the properties, determined by the measurement methods above, of the hotmelt adhesives prepared in the examples.

Example 1 (Comparative)

A polyester mixture of Durez Ter S1151-22 and Dynacoll® 7250 in the quantities reported in table 1 was charged to a 1 liter reaction vessel with nonstick coating and a 4-neck lid with ground glass joints. This initial charge was melted in an oil bath with temperature control at 120° C. for 4 hours.

The liquid polyol mixture thus obtained was dewatered in a high vacuum with stirring for an hour, with the temperature maintained.

Then MDI in an NCO/OH molar ratio of 2:1 was added to the polyol in the reaction vessel, and reaction took place with stirring for 1 hour, with the temperature maintained. The reaction product formed was kept at room temperature in the absence of moisture.

Example 2 (Comparative)

The prepolymer preparation procedure described in example 1 was carried out identically with the components reported in table 1 and quantities for example 2, using Desmodur VP LS 2397 instead of MDI. The reaction product formed was kept at room temperature in the absence of moisture.

Example 2b (Comparative)

A prepolymer was prepared with the quantities reported in table 1, in the manner described in example 1, and the amount of Desmodur VP LS 2397 listed in table 1 was mixed homogeneously at a temperature of 120° C. for 30 minutes. The reaction product formed was kept at room temperature in the absence of moisture.

Examples 3 and 3b (Comparative)

A prepolymer was prepared with the quantities reported in table 1, in the manner described in example 1, and the amounts of Silquest®A-189 listed in table 1 were mixed homogeneously at a temperature of 120° C. for 1 hour. The reaction product formed was kept at room temperature in the absence of moisture.

Examples 4 to 8 (Examples 5 and 8 are Comparative Examples)

A prepolymer was prepared with the quantities reported in table 1, in the manner described in example 1, and the amounts of Desmodur VP LS 2397 listed in table 1 were mixed homogeneously at a temperature of 120° C. for 30 minutes.

Thereafter the amount of Silquest®A-189 listed in table 1 was mixed homogeneously for 1 hour with the temperature maintained. The reaction product formed was kept at room temperature in the absence of moisture.

TABLE 1*

(amounts in wt %)

| | Example | | | | | | | | | |
|---|---|---|---|---|---|---|---|---|---|---|
| | 1 | 2 | 2b | 3 | 3b | 4 | 5 | 6 | 7 | 8 |
| Formula | | | | | | | | | | |
| Durez Ter S1151-22 | 52.1% | 32.6% | 45.6% | 51.3% | 52% | 44.6% | 43.7% | 45% | 28.1% | 48.3% |
| Dynacoll 7250 | 34.7% | 21.7% | 30.4% | 34.2% | 34.7% | 29.7% | 29% | 30% | 18.8% | 32.2% |

TABLE 1*-continued (amounts in wt %)

| | Example | | | | | | | | | |
|---|---|---|---|---|---|---|---|---|---|---|
| | 1 | 2 | 2b | 3 | 3b | 4 | 5 | 6 | 7 | 8 |
| Desmodur VP LS 2397 | — | 45.7% | 14% | — | — | 14% | 13.7% | 14.1% | 45% | 7% |
| Silquest A-189 | — | — | — | 3.3% | 1.9% | 1.9% | 4% | 1% | 1.9% | 1.9% |
| MDI | 13.2% | — | 10% | 11.2% | 11.4% | 9.8% | 9.6% | 9.9% | 6.2% | 10.6% |
| Results of measurement | | | | | | | | | | |
| Residual monomer | 2.3% | <0.1% | 1.1% | 0.57% | 1.1% | 0.46% | 0.49% | 0.80% | 0.46% | 0.88% |
| Through-curing 55% rel. humidity [hours] | 19 | 33 | 21 | 42 | 35 | 32 | 51 | 22 | 32 | 22 |
| Heat stability | >200° C. | 140° C. | 130° C. | 90° C. | 160° C. | 160° C. | 90° C. | 140° C. | 140° C. | 130° C. |
| Heat stability by canvas cloth method, 7 d, 80° C. | OK | OK | OK | not OK | not OK | OK | not OK | OK | OK | not OK |
| Tensile strength [MPa] | 11.2 | 5.8 | 8.2 | 7.6 | 10.5 | 9.1 | 9.5 | 7.9 | 8.7 | 8.3 |
| Elongation at break [%] | 405 | 467 | 400 | 378 | 444 | 370 | 331 | 357 | 330 | 386 |

*Examples 4, 6, and 7 are inventive examples; all others are comparative examples Storage Stability The adhesives for examples 1, 2, 3, and 4 were investigated for their storage stability. The test here is of the storage stability in the application equipment under typical processing conditions, i.e., at elevated temperature. For this purpose, the compositions were stored at 140° C. and the viscosity was determined at defined intervals of time. Viscosity measurement was carried out continuously at 140° C.

For the measurement of the storage stability (stability of viscosity), the viscosity η [mPas] of the respective composition was measured by means of a Rheomat (Brookfield, Thermosel, spindle 27, shear rate 1 min$^{-1}$) after a storage time t at 140° C. The percentage increase in viscosity in the course of storage was determined relative to the viscosity after 30 minutes of storage.

From the viscosity values determined at each of the storage times, a determination was made of the percentage increase in viscosity over time, which is plotted as a graph in the figure. It is clearly evident that examples 2 and 3 exhibit relatively poor thermal stability, while the monomer-rich example 1 and the inventive, low-monomer-content example 4 display good thermal stability.

The invention claimed is:

1. A moisture-curing hotmelt adhesive obtainable by a process comprising
   A) reacting one or more polyols as component a) with one or more monomeric polyisocyanates as component b), the stoichiometric ratio of isocyanate groups to hydroxyl groups being greater than 1, to give a reaction product comprising an isocyanate-functional polyurethane prepolymer,
   B) adding at least one mercaptosilane of the formula (I) as component c)

$$HS-R^3-Si(X)_{(3-a)}(R^2)_a \quad (I)$$

in which $R^2$ is a linear or branched alkyl group having 1 to 10 C atoms, $R^3$ is a linear or branched alkylene group having 1 to 10 C atoms, X is a hydrolyzable radical, and a has a value of 0, 1 or 2,
   to the reaction product and carrying out reaction to give a reaction product modified with the mercaptosilane, and
   C) adding an isocyanate-functional polyurethane prepolymer having a monomeric polyisocyanate content of below 1 wt % as component d) before, during and/or after the adding of the at least one mercaptosilane,
   the at least one mercaptosilane being added in an amount of 0.5 to 3.5 wt % and the isocyanate-functional polyurethane prepolymer as component d) being added in an amount of 10 to 50 wt %, based in each case on the total weight of the components a) to d), wherein the isocyanate-functional polyurethane prepolymer comprised in the reaction product of step A) is different from the component d) isocyanate-functional polyurethane prepolymer having a monomeric polyisocyanate content of below 1 wt %.

2. The moisture-curing hotmelt adhesive as claimed in claim 1, wherein the isocyanate-functional polyurethane prepolymer as component d) is added in an amount of 10 to 45 wt % based on the total weight of components a) to d).

3. The moisture-curing hotmelt adhesive as claimed in claim 1, wherein the stoichiometric ratio of isocyanate groups to hydroxyl groups in step A) is in the range from 1.3 to 2.5.

4. The moisture-curing hotmelt adhesive as claimed in claim 1, wherein the at least one mercaptosilane is added in an amount of 1 to 3.3 wt % based on the total weight of components a) to d).

5. The moisture-curing hotmelt adhesive as claimed in claim 1, wherein in step A) the at least one polyol is a diol and/or the polyol used comprises one or more polyether polyols, polyester polyols, polycarbonate polyols or a mixture of these polyols, and component a) comprises at least one liquid polyester diol, at least one amorphous polyester diol or at least one amorphous polycarbonate diol.

6. The moisture-curing hotmelt adhesive as claimed in claim 1, wherein the mercaptosilane is a mercaptosilane of the formula (I) in which X is $OR^4$, $R^4$ being a linear or branched alkyl group having 1 to 10 C atoms which optionally contains 1 or 2 ether oxygens.

7. The moisture-curing hotmelt adhesive as claimed in claim 1, wherein the monomeric polyisocyanate as component b) has a molecular weight of not more than 500 g/mol.

8. The moisture-curing hotmelt adhesive as claimed in claim 1, wherein in step B) the mercaptosilane is reacted with the reaction product at a temperature of at least 60° C.

9. The moisture-curing hotmelt adhesive as claimed in claim 1, wherein in step C) the isocyanate-functional polyurethane prepolymer as component d) is a reaction product of at least one polyol and at least one monomeric polyisocyanate, with unconverted monomeric polyisocyanate having been removed by distillation or extraction to a residual content of below 1 wt % in the reaction product.

10. The moisture-curing hotmelt adhesive as claimed in claim 1, wherein the hotmelt adhesive is admixed further with one or more thermoplastic polymers and/or one or more additives, more selected from fillers, catalysts, plasticizers, adhesion promoters, UV absorbers, UV and heat stabilizers, antioxidants, flame retardants, optical brighteners, pigments, dyes, and dryers.

11. The moisture-curing hotmelt adhesive as claimed in claim 1, wherein it has a monomeric polyisocyanate content of not more than 1.0 wt %.

12. A process for preparing a moisture-curing hotmelt adhesive, comprising
   A) reacting one or more polyols as component a) with one or more monomeric polyisocyanates as component b), the stoichiometric ratio of isocyanate groups to hydroxyl groups being greater than 1, to give a reaction product comprising an isocyanate-functional polyurethane prepolymer,
   B) adding at least one mercaptosilane of the formula (I) as component c)

$$\text{HS}—R^3—\text{Si}(X)_{(3-a)}(R^2)_a \quad (I)$$

in which $R^2$ is a linear or branched alkyl group having 1 to 10 C atoms, $R^3$ is a linear or branched alkylene group having 1 to 10 C atoms, X is a hydrolyzable radical, and a has a value of 0, 1 or 2,
   to the reaction product and carrying out reaction to give a reaction product modified with the mercaptosilane, and
   C) adding an isocyanate-functional polyurethane prepolymer having a monomeric polyisocyanate content of below 1 wt % as component d) before, during and/or after the adding of the at least one mercaptosilane,
   the at least one mercaptosilane being added in an amount of 0.5 to 3.5 wt % and the isocyanate-functional polyurethane prepolymer as component d) being added in an amount of 10 to 50 wt %, based in each case on the total weight of the components a) to d), wherein the isocyanate-functional polyurethane prepolymer comprised in the reaction product of step A) is different from the component d) isocyanate-functional polyurethane prepolymer having a monomeric polyisocyanate content of below 1 wt %.

13. A method for adhesively bonding a substrate S1 to a substrate S2, comprising the steps of
   i) heating a moisture-curing hotmelt adhesive as claimed in claim 1 to a temperature of between 80° C. and 200° C.;
   ii) applying the heated moisture-curing hotmelt adhesive to a substrate S1;
   iii) contacting the applied moisture-curing hotmelt adhesive with a second substrate S2; and
   iv) chemically curing the moisture-curing hotmelt adhesive with water;
   the substrate S2 consisting of the same material as or different material from the substrate S1, and at least one of the substrates, S1 or S2, being a polymeric film, a textile or glass.

14. An article bonded by a method as claimed in claim 13.

15. The moisture-curing hotmelt adhesive as claimed in claim 1, is applied in at least one of the following: adhesive bonds, vehicle construction, textile, furniture and/or packaging material.

* * * * *